United States Patent [19]
Reid et al.

[11] Patent Number: 6,080,309
[45] Date of Patent: Jun. 27, 2000

[54] MEANS FOR SEPARATION AND REMOVAL OF IMPURITIES FROM LIQUIDS

[76] Inventors: Allen F. Reid, 4736 Reservoir Rd., Geneseo, N.Y. 11454; Albert H. Halff, 3514 Rock Creek Dr., Dallas, Tex. 75225

[21] Appl. No.: 08/439,036

[22] Filed: May 11, 1995

Related U.S. Application Data

[63] Continuation of application No. 08/126,691, Sep. 14, 1993, abandoned, which is a continuation of application No. 07/787,362, Nov. 4, 1991, abandoned.

[51] Int. Cl.$^7$ .......................................................... C02F 1/0

[52] U.S. Cl. ........................ 210/177; 210/761; 210/512.1; 210/180; 210/188; 210/202

[58] Field of Search ..................................... 210/758, 761, 210/762, 774, 175, 177, 180, 188, 512.1, 202

[56] References Cited

U.S. PATENT DOCUMENTS

| | | | |
|---|---|---|---|
| 3,920,548 | 11/1975 | Fassell et al. | 210/761 |
| 4,108,763 | 8/1978 | Clough | 210/758 |
| 4,673,510 | 6/1987 | Janusch et al. | 210/774 |
| 5,147,563 | 9/1992 | Long, Jr. et al. | 210/758 |

*Primary Examiner*—David A. Simmons
*Assistant Examiner*—Chester T. Barry
*Attorney, Agent, or Firm*—Joseph J. Previto

[57] ABSTRACT

The method of separating impurities from an aqueous solution by means of rotating the aqueous solution at high speeds until a high pressure and a high temperature is reached. At that time the impurities are separated from the solution. The aqueous solution is kept at high temperatures and pressures until the impurities are separated from the liquid. Preferably, a device providing a centrifugal force, such as a centrifuge, is used to achieve the high temperatures and pressures which should preferably be no lower than 705.4° F. and 3,208 psi, respectively.

8 Claims, 1 Drawing Sheet

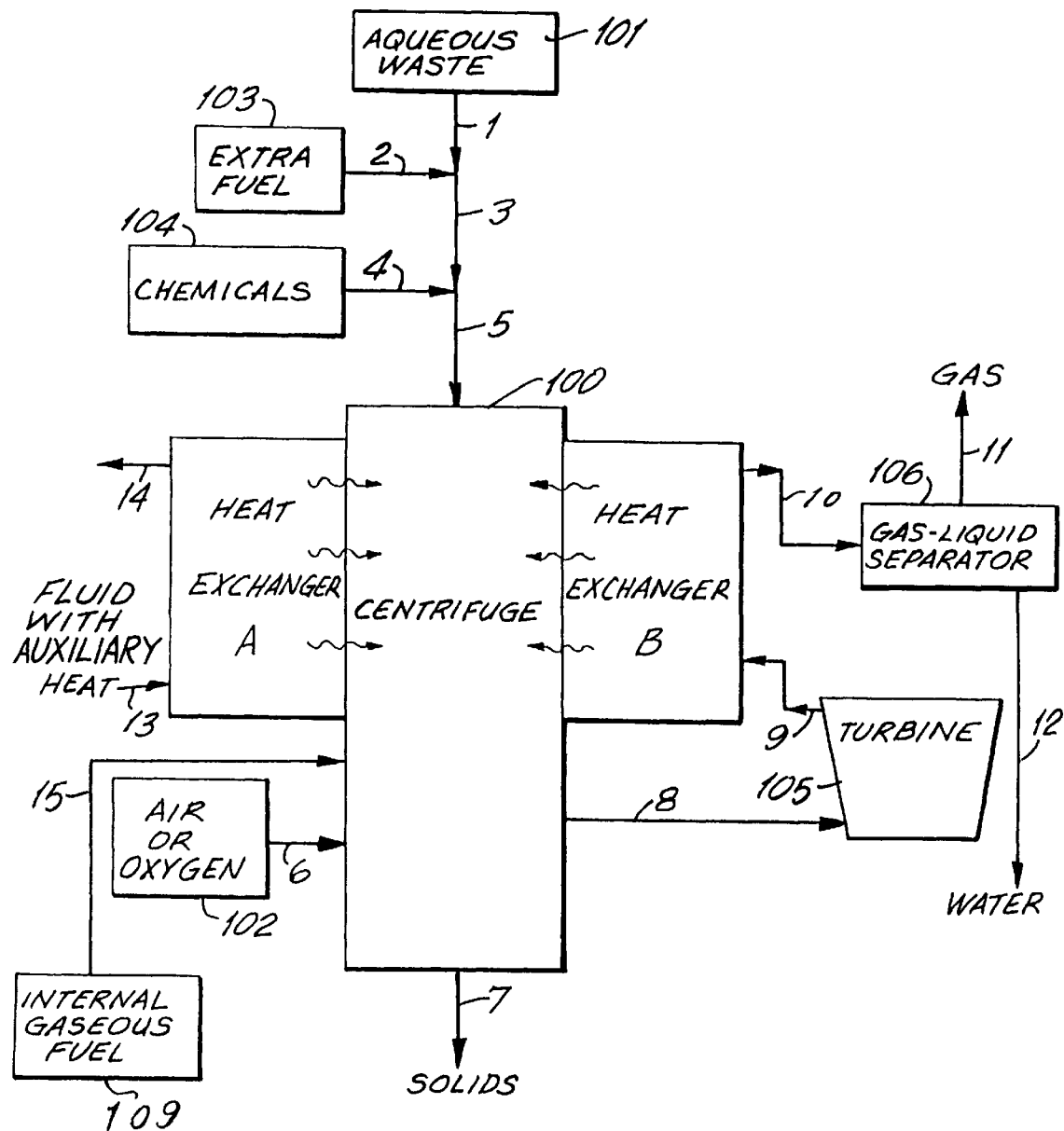

MEANS FOR SEPARATION AND REMOVAL OF IMPURITIES FROM LIQUIDS

This application is a continuation of U.S. application Ser. No. 08/126,691 filed Sep. 14, 1993, now abandoned, which was a continuation of Ser. No. 07/787,362 filed Nov. 4, 1991, now abandoned.

BACKGROUND

The present invention relates to the separation of impurities from liquid and more particularly relates to removal of such impurities from an aqueous environment.

With the increase in industrial production throughout the world, there has been an increase in the impurities (e.g. waste material) which naturally results from any number of industrial processes. Hence, it is important that ways be found for efficient and inexpensive separation and removal of such impurities.

Over the years, a number of processes and mechanisms have been developed for separation of and of such impurities. One such method is the wet air oxidation process in which organic materials present in an aqueous solution are oxidized at high temperatures and high pressures. It is believed that a number of basic systems have been developed to treat such organic material with wet air oxidation. Some of these are the Zimpro Above Ground Vertical Reactor ("Going with the Flow", *Hazmot World* November 1988); the Wetox Stirred Tank Reactor (*Journal of Hazardous Materials* 8[1], June 1983, p.3); Vertech Underground Reactor (Optaken, Edward J., *Aqueous Phase Oxidation of Sludge Using the Vertical Reactor Vessel*, January 1987 No. CS-809337-0-1, p. 5) and Supercritical Water, Reactor Systems (Modell patents such as U.S. Pat. Nos. 4,338,199; 4,061,566; and others).

BRIEF DESCRIPTION

The present invention is an improvement over the processes and mechanisms that have been used in the past for the separation and removal of impurities, such as hazardous waste materials from aqueous environments.

For ease and clarity, the present invention will be described with respect to the destruction of hazardous waste materials. However, it will be understood that the present invention may be used for the separation and removal of a number of other impurities from aqueous solutions, such as the desalination of brackish or sea water.

In general, a waste suspension is introduced into a high-speed centrifuge or some other device which generates high pressure by rotation. Through centrifugation, the suspension is brought to a critical pressure. Heat may be supplied through traditional means to augment heat from the centrifugation and chemical reactions. This brings the waste suspension to a critical state of water. Oxygen in any form is introduced to the suspension at that critical state to cause destruction of much of the waste materials to which those conditions are destructive. The waste is held at the high temperatures and pressures with the oxygen until an appropriate destruction of the wastes has been effected and until an appropriate precipitation of the solids is effected. Heat and mechanical energy is recovered from the effluents from the centrifuge. This reduces the net energy requirements of the process. Removal of solids separated in the process may be accomplished by any conventional means. To avoid increased cost of operation and construction, the system is designed so that desired pressure is produced before the aqueous suspension is heated enough to bring density so low that a large increase of G's is needed.

Excellent results are obtainable with temperatures above 374.1° C. (705.4° F.) and pressures above 218.3 atm (3208 psi).

The heat necessary to bring the temperature of the waste solution up to the desired temperature comes from oxidation of the waste, heat recovered from the water after the waste is destroyed and auxiliary heat from either or both of oxidation of extra fuel going through with the waste and/or externally provided heat such as from congeneration or heat from other sources.

Chemicals may be added if necessary; for example, caustic soda to neutralize acids liberated during the oxidation such as nitric, sulfuric or the halogen acids; or when the oxidizing agent is in solution—such as hydrogen peroxide.

The very high number of G's in the centrifuge make it excellent for separation of solids released from the waste, including salts and certain oxides. Much of the potential energy of the high pressure/high temperature water leaving the centrifuge may be recovered in a turbine which may be coupled to the centrifuge power source, or alternatively, may be used for other power purposes. An alternate arrangement may be used in which the effluent from the centrifuge is routed to the heat exchanger before the turbine. The heat exchanger serves as a condenser for the turbine.

The present invention may be used for the removal of unwanted solids dissolved in water, as in desalination of brackish or sea water. In such application, the solids removal depends on the great reduction in solubility of the solids in water at its critical states. If the solution or suspension being treated has only small amounts of oxidizable material, most of the heat required is furnished by oxidation of fuel going through with the aqueous material, heat recovered from the water after treatment, and/or externally provided heat.

DRAWING

A preferred embodiment of the invention has been chosen for purposes of illustration and description and is shown in the accompanying drawings forming a part of the specification, wherein:

The single FIGURE in the drawing is a schematic plan view of the improved process of the present invention and the improved manner of performing it.

DESCRIPTION

Referring to the drawing, the suspension (which for ease and clarity is being described as an aqueous waste) is introduced into a high-speed centrifuge 100 from a source 101 through piping 1-3-5. Through centrifugation, the suspension in the centrifuge 100 is brought to a critical pressure, above 218.3 atm (3208 psi). As indicated above, centrifugation may be accomplished by any mechanism which will achieve high rotational speeds, such as a turbine or similar mechanism. Heat may be supplied through traditional means to augment heat from the centrifugation and chemical reactions. For example, heat may be supplied from Heat Exchanger B after the waste is destroyed or from Heat Exchanger A from other sources. This brings the waste suspension to a critical state of water. Good results have been obtained with temperatures above 374.1° C. (705.4° F.). Oxygen in any form is introduced to the suspension at that critical state from the source 102 through piping 6 to cause destruction of much of the waste materials to which those conditions are destructive. Alternatively, oxygen may be introduced with the aqueous waste material from the source 101 as a liquid, for example, hydrogen peroxide, in which case the 102 may not be needed.

The waste is held at the high temperatures and pressures with the oxygen until an appropriate destruction of the wastes has been effected and until an appropriate separation of the solids is effected through the outlet 7. Heat and mechanical energy is recovered from the effluents from the centrifuge. This reduces the net energy requirements of the process. To avoid increased cost of operation and construction, the system is designed so that desired pressure may produced before the aqueous suspension is heated enough to, bring density so low that a large increase of G's is needed.

The heat necessary to bring the temperature of the waste solution up to that desired may come from oxidation of the waste or heat recovered from the water after the waste is destroyed as illustrated by Heat Exchanger B. Auxiliary heat may also come from either or both of oxidation of extra fuel supplied to the waste from a source 103 through piping 2 and/or externally provided heat (as from congeneration or cheap heat from other sources) introduce by piping 13–14 to Heat Exchanger A. Chemicals may be added if necessary, from a source 104 through the piping 4. For example, caustic soda may be added to neutralize acids liberated during the oxidation (such as nitric, sulfuric or the halogen acids) or when the oxidizing agent is in solution—such as hydrogen peroxide.

The very high number of G's in the centrifuge make it excellent for separation of solids released from the waste, including salts and certain oxides. Much of the potential energy of the high pressure/high temperature water leaving the centrifuge may be recovered in a turbine 105 which may be coupled to the centrifuge power source through piping 8–9, or alternatively, may be used for other power purposes. The Heat Exchanger B serves as a condenser for the turbine 105. A gas liquid separator 106 is also provided to receive the effluent through piping 10 and to separate the gas from the water and emit them from the separator by piping 11–12 respectively. An alternate arrangement may be used in which the effluent from the centrifuge is routed to the heat exchanger before the turbine.

The gas is mostly carbon dioxide from the combustion, some oxygen and water vapor and, when air is used, nitrogen.

If desired, internal gaseous fuel may be introduced after pressure is built up to preserve complete solution into the suspension up to the critical pressure. If this fuel has liquefied, it may be introduced at a position into the centrifuge where the pressure is above the liquefication pressure of the fuel. If the fuel is still gaseous when the centrifuge reaches its highest pressure, it may be introduced into the centrifuge at high pressure from source 109 through piping 15.

As indicated above, the method and means of the present invention may be used in non-waste environments for the removal of unwanted solids dissolved in water, as in desalination of brackish or sea water. In such application, as in hazardous waste removal, the solids removal depends on the great reduction in solubility of the solids in water at its critical states. If the solution or suspension being treated has only small amounts of oxidizable material, most of the heat required is furnished by oxidation of fuel going through with the aqueous material, heat recovered from the water after treatment, and/or externally provided heat as described above. In addition, as stated above, while the invention has been described with respect to a centrifuge 100, it will be understood that the invention may be practiced with any mechanism which generates high pressure through rotation.

It will be seen that the present invention provides an improved process and mechanism for separation and removal of impurities from an aqueous environment.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A system for separating impurities from an aqueous solution which comprises a rotatable mechanism, said rotatable mechanism having a solution-receiving chamber therewithin, means for introducing an aqueous solution into the solution-receiving chamber of said rotatable mechanism, means for rotating said rotatable mechanism together with the solution-receiving chamber therewithin and while said aqueous solution is within said solution-receiving chamber at high speeds whereby the aqueous solution within said solution-receiving chamber is rotated with the rotatable mechanism said solution-receiving chamber being a closed chamber for maintaining said aqueous solution within said solution receiving-chamber while the rotatable mechanism is being rotated, means for continuing the rotation of the rotatable mechanism until a high pressure is reached and means for continuing the rotation of the rotatable mechanism until a high temperature is reached which the impurities are separated from the solution, means for adding heat to the solution during rotation of the rotatable mechanism, means for maintaining the aqueous solution at said high temperature and said high pressure until the impurities are separated from the solution whereby said continued rotation results in temperatures reaching at least above 705.4° and pressures reaching at least above 3208 psi.

2. A mechanism as claimed in claim 1 wherein a centrifuge is provided to achieve said rotation.

3. A mechanism as claimed in claim 1 wherein means are provided to add oxygen to the solution.

4. A mechanism as claimed in claim 1 wherein means are provided to add extra fuel to the solution.

5. A mechanism as claimed in claim 1 wherein means are provided to add additional chemicals to the solution to neutralize acids.

6. A mechanism as claimed in claim 1 wherein means are provided to add an oxidizing agent to the solution.

7. A mechanism as claimed in claim 1 wherein means are provided to recover potential energy from the solution.

8. A mechanism as claimed in claim 1 wherein means are provided operatively connected to said rotatable mechanism to separate gas from liquid.

* * * * *